United States Patent [19]

Hofmann

[11] Patent Number: 5,043,725
[45] Date of Patent: Aug. 27, 1991

[54] BROADBAND SIGNAL SWITCHING EQUIPMENT

[75] Inventor: Ruediger Hofmann, Gilching, Fed. Rep. of Germany

[73] Assignee: Siemens Aktiengesellschaft, Munich, Fed. Rep. of Germany

[21] Appl. No.: 497,323

[22] Filed: Mar. 22, 1990

[30] Foreign Application Priority Data

Mar. 22, 1989 [DE] Fed. Rep. of Germany ....... 3909550

[51] Int. Cl.$^5$ .............................................. H04Q 1/00
[52] U.S. Cl. ...................... 340/825.930; 340/825.91; 340/825.89; 307/468
[58] Field of Search ...................... 340/825.79, 825.85, 340/825.9, 825.91, 825.93, 825.89; 307/241, 465, 468, 571; 379/291, 292, 306

[56] References Cited

U.S. PATENT DOCUMENTS

| | | | |
|---|---|---|---|
| 3,639,908 | 2/1972 | Hovogimyan et al. | 340/825.91 X |
| 3,651,467 | 3/1972 | De Jean et al. | 340/825.91 X |
| 3,789,151 | 1/1974 | Richards | 379/292 |
| 4,060,699 | 11/1977 | Ataka et al. | 340/825.93 X |
| 4,346,381 | 8/1982 | Bauch et al. | 340/825.93 |
| 4,443,773 | 4/1984 | Rall et al. | 340/825.93 X |
| 4,801,936 | 1/1989 | Hofmann | 340/825.91 |
| 4,897,645 | 1/1990 | Hofmann | 340/825.91 |
| 4,949,086 | 8/1990 | Hofmann | 340/825.91 |

FOREIGN PATENT DOCUMENTS 0264046 10/1987 European Pat. Off. .
2422136 2/1975 Fed. Rep. of Germany .
2608119 9/1976 Fed. Rep. of Germany .

OTHER PUBLICATIONS

"A 1-Mil$^2$ Single-Transistor Memory Cell In n Silicon-Gate Technology", by Stein et al, IEEE Journal of Solid-State Circuits, Oct., 1973, pp. 319-323.

Primary Examiner—Donald J. Yusko
Assistant Examiner—Edwin C. Holloway, III
Attorney, Agent, or Firm—Hill, Van Santen, Steadman & Simpson

[57] ABSTRACT

Broadband signal switching equipment in a switching point matrix having matrix input lines connected via switching element couples, to matrix output lines having respectively two signal conductors. The two signal conductors are connected with signal inputs of a differential amplifier with a trigger characteristic. The two signal conductors of each matrix output line are connected with the operating potential source via a respective precharge transistor. The switching element couples respectively have two auxiliary transistors of different channel types, which are connected by their control electrode to the only signal conductor of the appertaining matrix input line and which form a series connection respectively with one switch transistor preferably of the same channel type. The output terminals of successive switching elements of a matrix output line are respectively connected to the signal conductors thereof in an alternating fashion.

10 Claims, 3 Drawing Sheets

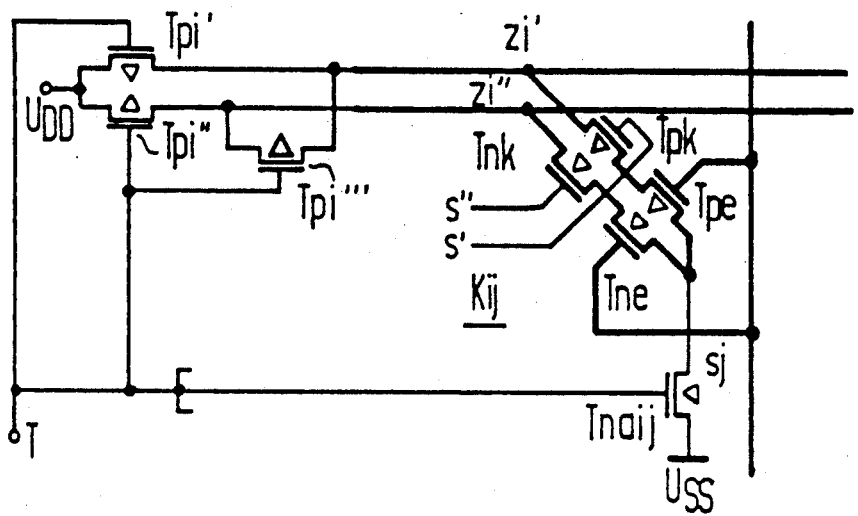
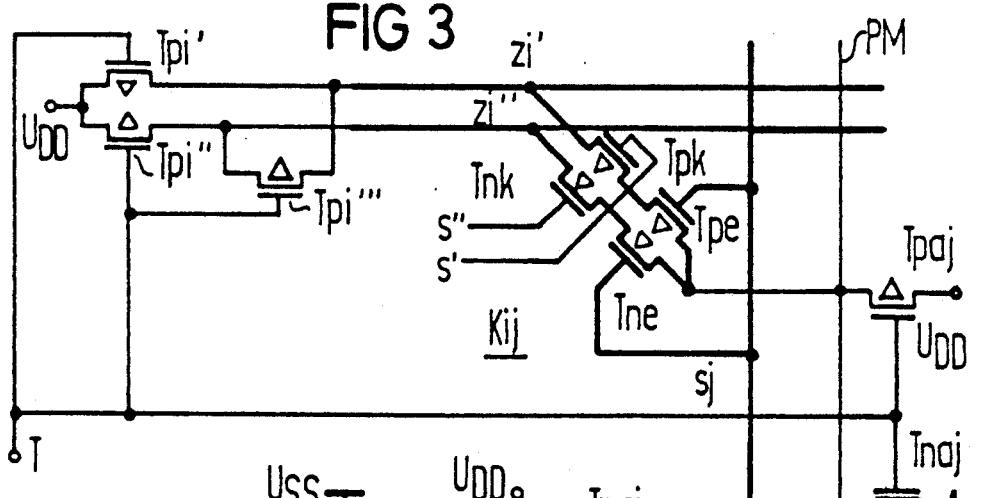
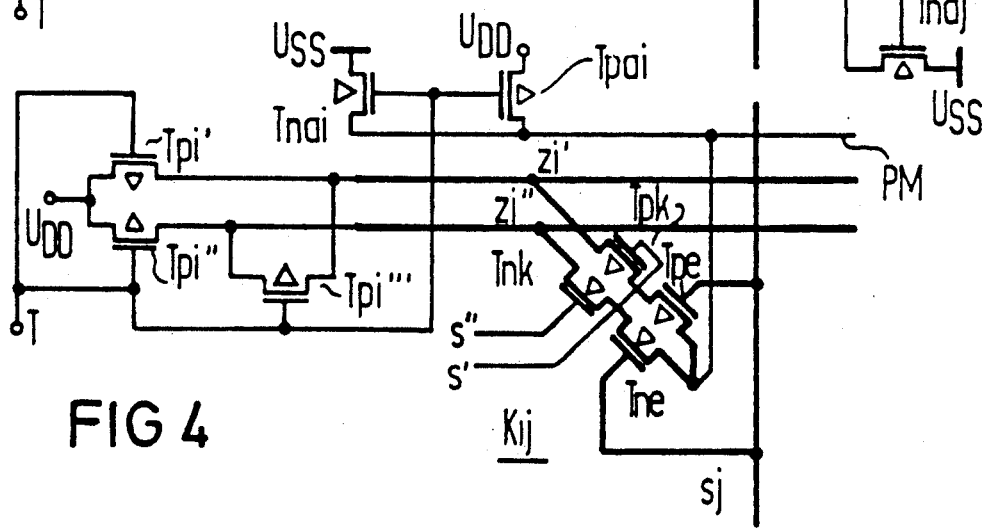

BROADBAND SIGNAL SWITCHING EQUIPMENT

BACKGROUND OF THE INVENTION

Circuits having ECL-technology devices are characterized by features such as high operating speed, medium to high integration degree and medium to high power dissipation/power losses. However, circuits having FET-technology devices with merely medium operating speeds are known for having a very high integration degree and very low power losses. These last features have made it desireable to increase the speeds of integrated circuits having FET-technology devices to a level which so far has been only possible using bipolar technology devices.

For broadband signal switching equipment with a switching point matrix having matrix input lines respectively constituted by two signal conductors, these matrix input lines on the one hand are connected respectively to two differential (complementary) outputs of a digital input signal circuit, and on the other hand, are connectable, via switching points, to matrix output lines also constituted by two signal conductors. These matrix output lines having two signal conductors are connected to the two signal inputs of an output amplifier circuit constituted by a differential amplifier. A switching point matrix having FET-technology devices is disclosed in European reference EP-A-0 264 046 (corresponding to U.S. Pat. No. 4,897,645) wherein switching element couples are provided in the switching points and have, respectively, two switch transistors which receive on their control electrode a throughput signal or a blocking signal. The switch transistors of these switching element couples are connected with one main electrode respectively to one or the other signal conductor of the appertaining matrix output line which in turn is provided with an output differential amplifier with a trigger characteristic, whereby the switching element couples have two auxiliary transistors, respectively, which form a series connection with one switch transistor, these auxiliary transistors have their to the control electrodes connected to one or the other signal conductor of the appertaining matrix input line. One of their main electrodes is connected to one terminal (ground) of the operating voltage source, the other terminal being connected to each signal conductor of the respective matrix output line, respectively, via one precharge transistor. Precharge transistors and sampling transistors are charged oppositely to one another on their control electrodes with a selection clock for switching matrix arrays thereby dividing a bit-throughput-interval into a precharge phase and an actual throughput phase. As a result in each precharge phase for a blocked sampling transistor both signal conductors of the matrix output line are charged, at least approximately, to the potential at the other terminal of the operating voltage source, via the respective precharge transistor.

In addition to the advantages which are associated with a switching point matrix having FET-technology devices, this known broadband signal switching equipment has the further advantage that on one hand, for a blocked switching point, no interfering signals reach the matrix output via the switching point even without additional attenuation measures and that, on the other hand, for a conducting switching point and when the actual throughput occurs, recharging of the matrix output line always results in a recharging direction from the operating potential corresponding to the signal condition. This occurs even with a small recharging/charge reversal (corresponding to surpassing a threshold at this operating potential value and corresponding to the trigger point of the differential amplifier). Thus just as quickly a clean transition of the throughconnected digital signal occurs at the output of the switching equipment from one into the other signal condition.

In the case of such a broadband signal switching equipment a further increase in the operating speed can be provided in that the two precharge transistors, at their main electrodes facing the respective matrix output line, are connected with each other via a cross transistor, whose control electrode is connected to the control electrodes of the precharge transistors (disclosed in German reference DE-P 3819491.0) (corresponding to U.S. Pat. No. 4,949,086). In connection with the advantage of an acceleration of the precharging of the matrix output lines, there is also the further advantage of a very early potential balancing of the matrix output lines so that there is also correspondingly early starting conditions for good amplification via a following differential amplifier.

A further increase of the operating speed of the broadband signal switching equipment is achieved if in addition to a sampling transistor provided individually for the matrix input line, a precharge transistor, provided individually for the matrix input line, is used or, as an alternative, a precharge transistor, provided individually for the matrix output line, is used in addition to a sampling transistor provided individually for the matrix output line (disclosed in German reference DE-P 3819491.0).

The advantages of such known broadband signal switching equipment, which have matrix input lines respectively constituted by two signal conductors, that can be achieved regarding the power dissipation requirement and operating speed are associated with a corresponding space requirement for such matrix input lines, which respectively have two signal conductors. The present invention, however, provides a means for significantly reducing this space requirement.

SUMMARY OF THE INVENTION

The present invention relates to a broadband signal switching equipment with a switching point matrix having FET-technology devices, whose matrix input lines can be connected, via switching points respectively constituted by switching element couples, with matrix output lines respectively constituted by two signal conductors, to whose two signal conductors the two signal inputs of an output amplifier circuit composed of a differential amplifier with a trigger characteristic can be connected. The switching element couples are respectively composed of two switch transistors, which are charged respectively at a control electrode with a throughput or blocking signal and which have one main electrode connected to one or the other signal conductor of the appertaining matrix output line, and two auxiliary transistors respectively forming a series connection with a switch transistor. These auxiliary transistors are connected via one main electrode to a signal conductor, respectively, of the appertaining matrix input line and have the other main electrode connected to one terminal of the operating voltage source via a sampling transistor, which is provided individually for the switching element, the matrix input line, or the matrix output line. The other terminal of the operating voltage source is connected to each signal conductor of the respective matrix output line, respectively, via a precharge transistor. The precharge transistor and the sampling transistor are charged oppositely relative to one another at their respective control electrode with a selection clock for switching matrix arrays thereby dividing a bit-throughconnecting-interval into a precharging phase and an actual throughconnecting phase. As a result, each prephase for a blocked sampling transistor both signal conductors of the matrix output line are charged, via the respective precharge transistor, at least approximately to the potential prevailing at the other terminal of the operating voltage source. The two precharge transistors are connected to each other at their main electrodes which are opposed from the respective matrix output line via a cross transistor whose control electrode is connected to the control electrodes of the precharge transistors. According to the present invention this broadband signal switching equipment is characterized in that the switching element couples respectively have two auxiliary transistors of various channel types which have their control electrodes connected to the same signal conductor of the appertaining matrix input line.

The present invention provides the advantage that only one single signal conductor, with a correspondingly reduced space requirement, is necessary per matrix input line while preserving the advantageous features of the initially mentioned known broadband signal switching equipment.

An even more obvious reduction of the space requirement can be achieved if, as in a further embodiment of the present invention, the switching element couples respectively have two switch transistors of different channel types in a series connection with an auxiliary transistor of the same channel type.

In order to prevent an unbalanced load of the two signal conductors of the matrix output lines, and, thus, an unbalanced load of the two inputs of a following differential amplifier the broadband signal switching equipment of the present invention can further be fashioned such that only a part of the switching element couples connected to the same matrix output line has the transistor series connection of the one channel type connected to one signal conductor and the transistor series connection of the other channel type connected to the other signal conductor of the matrix output line. In the case of the other part of the switching element couples connected to a respective matrix output line, the transistor series connection of the other channel type is connected to one signal conductor, and the transistor series connection of the one channel type is connected to the other signal conductor of the matrix output line. This can particularly occur, in one direction or respectively the other direction, switching element couples connected with the signal conductors of the appertaining matrix output line follow each other in the respective matrix row in an alternating fashion.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2, FIG. 3 and FIG. 4 show examples of the circuit-related realization of the switching elements of FIG. 1.

DESCRIPTION OF THE PREFERRED EMBODIMENT

Figure 1:
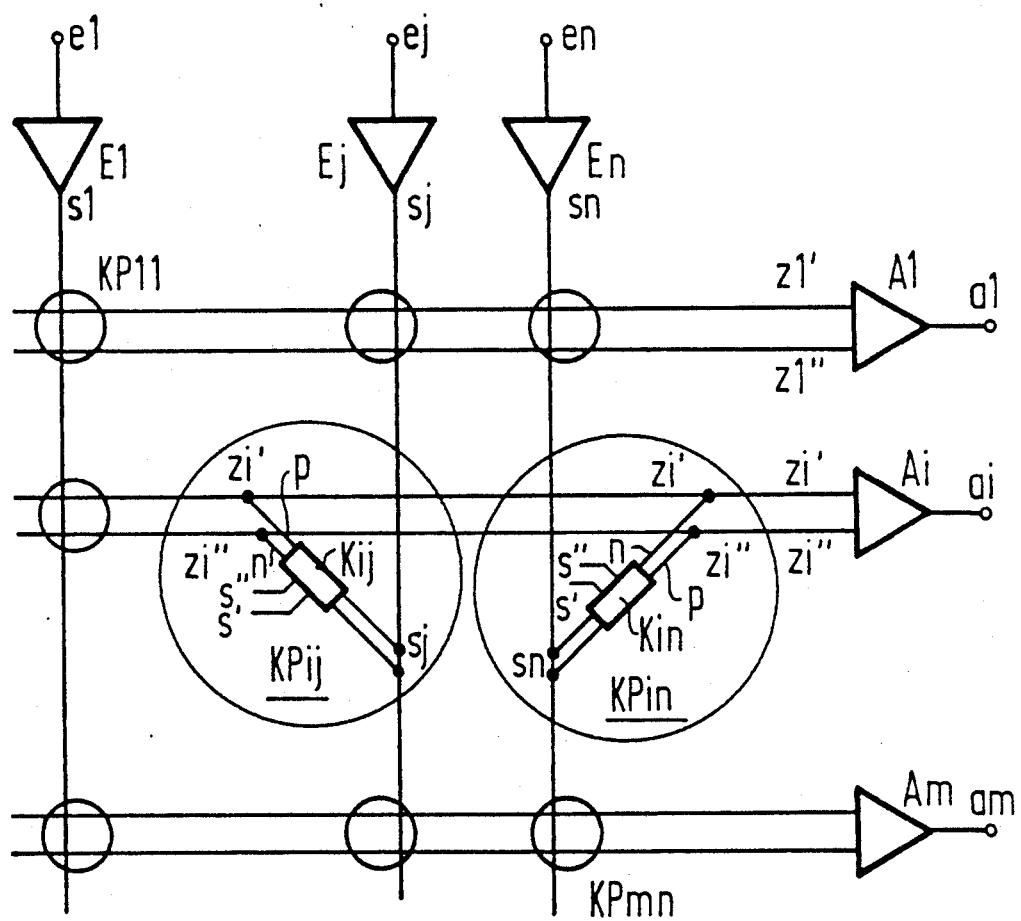
FIG. 1 shows the principle of a broadband signal switching equipment according to the present invention.

FIG. 1 schematically illustrates to an extend necessary to comprehend the present invention broadband signal switching equipment at whose inputs el ... ej ... en, and for connecting to column lines sl ... sj ... sn of a switching point matrix, input digital signal circuits El ... Ej ... En are provided, and whose outputs al .. . ai ... am, connected to row lines zl ... zi ... zm of the switching point matrix are provided with output amplifier circuits Al ... Ai ... Am.

The switching point matrix has switching points KPll ... KPIJ ... KPmn whose switching elements, as is shown in detail at the switching point KPij for its switching element Kij, can be controlled respectively at control inputs s', s" by an address decoder element (not illustrated in the drawing) or by a hold-storage element, which is not set forth in detail since such selections of switching elements are generally known and are disclosed, for example, in European reference EP-Al-0 262 479 (corresponding to U.S. Pat. No. 4,801,936).

The matrix input lines (column lines) respectively composed of only one signal conductor are connected via switching points KPll, ... KPij, ... KPnm, composed of switching element couples (Kij at the switching point KPij in FIG. 1), to matrix output lines (row lines), which are respectively composed of two signal conductors zl', zl"; ... ;zi', zi"; ... zm',zm". These are respectively connected to the two signal inputs of output amplifier circuits Al, ... Ai ... Am, each composed of a differential amplifier with a trigger characteristic.

Such a differential amplifier with a trigger characteristic can be realized with a known gated flipflop (from /a/ IEEE Journal of Solid-State Circuits, Oct. 1973, 319 ... 323, FIG..6) and also from various modifications (e.g. from /b/ DE-OS 24 22 136, FIG. 3 (16') and from /c/ DE-OS 26 08 119, FIG. 5) whereby a balancing transistor provided therein (in /a/ and /b/) as well as precharge transistors (in /b/) or load transistors (in /c/) provided therein are expediently fashioned as p-channel transistors. Another realization is disclosed in European reference EP-A-0 264 046 (corresponding to U.S. Pat. No. 4,897,645), FIG. 5.

FIGS. 2, 3 and 4 show how the switching element couples ... Kij ... can be realized by different circuits.

The switching element couples ... Kij ... are each respectively composed of two switch transistors Tpk, Tnk which are charged, at a control electrode, with a throughconnecting or blocking signal and are connected via a main electrode to one or the other signal conductor zi', zi" of the appertaining matrix output line. They are also composed of two auxiliary transistors Tpe and Tne of a different channel type forming a series connection with a switch transistor Tpk or Tnk, and which are connected respectively by a control electrode to the (only) signal conductor sj of the appertaining matrix input line (column line) ... sj .... As can be seen in FIGS. 2, 3 and 4 the two switch transistors Tpk, Tnk are of a different channel type, so that respectively a switch transistor Tpk (or Tnk) and an auxiliary transistor Tpe (or Tne) of the same channel type form a series connection. With their main electrode, which is opposed to the series connection, the auxiliary transistors Tpe and Tne are connected to one terminal $U_{SS}$ (ground) of the operating voltage source via a sampling transistors Tna (namely Tnaij in FIG. 2 or Tnaj in FIG. 3 or Tnai in FIG. 4). With the other terminal $U_{DD}$ of the operating voltage source the two signal conductors (zi',zi'') of the respective matrix output line (row line) . . . zi . . . are connected respectively via a precharge transistor Tpi' or Tpi''. At their main electrodes opposed from the respective matrix output line (zi',zi''), the two precharge transistors Tpi', Tpi'' are connected with each other via a cross transistor Tpi''' whose control electrode is connected with the control electrodes of the precharge transistors Tpi', Tpi''.

As also shown in FIG. 2, one sampling transistor Tnaij is provided for each switching element couple. Alternatively, as shown in FIG. 3, one common sampling transistor (Tnaj in FIG. 3) can be provided for all switching element couples connected to the same matrix input line (column line) . . sj . . , which is thus a sampling transistor provided for each matrix input line. Also, it is possible, as shown in FIG. 4, that one sampling transistor (Tnai in FIG. 4) is provided that is common to all switching element couples connected to the same matrix output line (row line) . . zi . . . , which is thus a sampling transistor provided for each matrix output line. As shown in FIG. 3, it is possible that in addition to the sampling transistor Tnaj provided for each matrix input line, a precharge transistor Tpaj, provided for each matrix input line, is also provided. Further it is possible, as shown in FIG. 4, tat in addition to a sampling transistor Tnai, provided for each matrix output line, a precharge transistor Tpai provided for each matrix output line, is also provided.

As also indicated in FIG. 2 to FIG. 4, an embodiment of a switching point matrix uses CMOS-technology devices wherein the switch transistor Tnk and the auxiliary transistor Tne of one series connection Tne-Tnk, as well as, the appertaining sampling transistor Tpk and the auxiliary transistor Tpe of the other series connection Tpe-Tpk, as well as, the precharge transistors Tpi' and Tpi'' are p-channel transistors.

Since p-channel transistors (given the same current efficiency) must be designed twice as wide as n-channel transistors, it is useful (for the prevention of unbalanced loads of the two signal conductors zi',zi'' of a matrix output line resulting therefrom) for a realization of switching element couples with respectively two transistor series connections of different channel types shown in FIG. 2 to FIG. 4, that only a part of the switching element couples connected to the same matrix output line has the transistor series connection (Tpe, Tpk) of one channel type connected to one signal conductor (zi') and the transistor series connection (Tne, Tnk) of the other channel type connected to the other signal conductor (zi'') of the matrix output line. In the case of the other part of the switching element couples connected to the respective matrix output line, the transistor series connection (Tne, Tnk) of the other channel type is connected to one signal conductor (zi') and the transistor series connection (Tpe, Tpk) of the one channel type is connected to other signal conductor (zi'') of the matrix output line. It is possible thereby that, in one or another manner, switching element couples connected with the signal conductors of the appertaining matrix output line follow one another in the respective matrix row in an alternating fashion.

Such alternatingly successive switching elements are also indicated in FIG. 1. At the switching point KPij the output p of the p-channel transistor series connection (Tpe-Tpk in FIG. 2) is connected to one signal conductor zi' of the appertaining matrix output line, and the output of the n-channel transistor series connection (Tne-Tnk in FIG. 2) is connected to the other signal conductor zi''. FIG. 1 then indicates that, in a corresponding manner, the other switching points for the matrix input line sj are connected to the other matrix output lines. FIG. 1 furthermore shows that in the case of the switching points for the matrix input line sn, the switching element outputs are connected with the two signal conductors of the respective matrix output line in a reverse direction. As illustrated in FIG. 1 in more detail for the switching point KPin, in this matrix column the output n (see FIG. 2) of the n-channel transistor series connection of the respective switching element couple (e.g. Kin) is connected with one signal conductor (zi' in FIG. 1), whereas the output p (see FIG. 2) of the p-channel transistor series connection of the respective switching element couple (e.g. Kin) is connected with the other signal conductor (zm'' in FIG. 1) of the respective matrix output line. Correspondingly, it is possible that the switching elements of all switching points connected between different matrix input lines sl . . . sn (in FIG. 1) and the same matrix output line (e.g. zi', zi'') are alternately connected with their n-channel branch from one matrix column and another matrix column to one signal conductor (zi') and the other signal conductor (zi'') of the respective matrix output line, and are connected with their p-channel branch alternatingly connected to the other signal conductor (zi'') and to before the one signal conductor (zi') of the respective matrix output line.

Figure 5A:
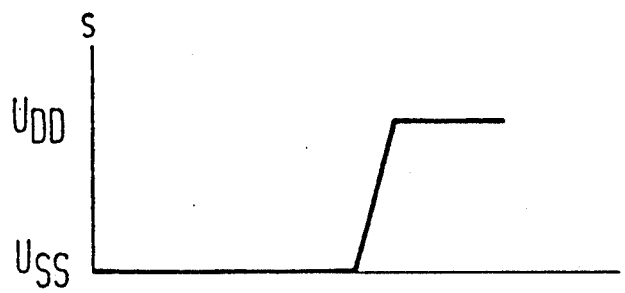
FIGS. 5a-5d shows signal curves of the circuit of the present invention.
Figure 5B:
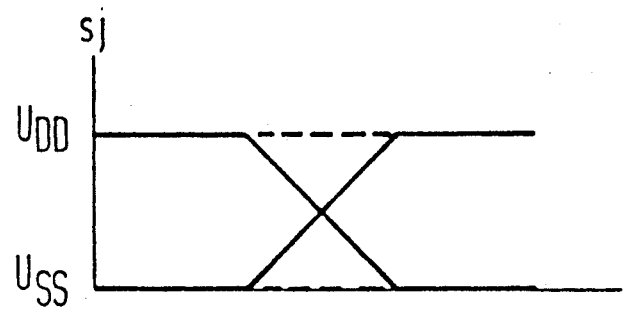
Figure 5C:
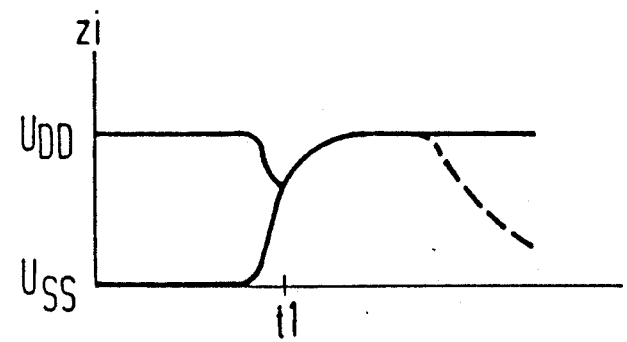
Figure 5D:
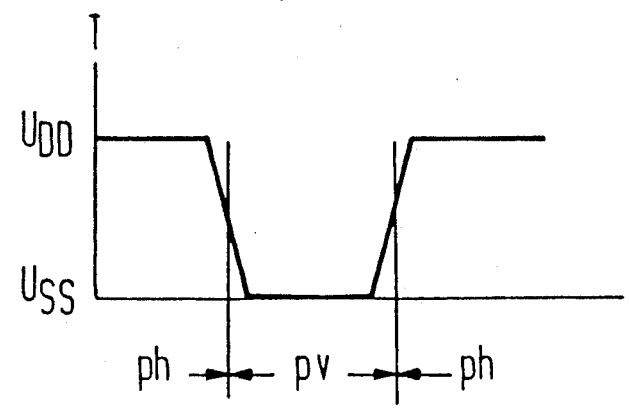

FIGS. 2 to 4 also show that the precharge transistors Tpi and the sampling transistors Tna are charged oppositely relative to one another at their respective control electrode with a clock T, thereby dividing a bit-through switching interval into a prephase pv and a main phase ph (in the manner indicated at the bottom of FIG. 5d), this clock T being indicated in FIG. 5d.

During the prephase pv (see FIG. 5d, bottom) the two signal conductors (zi',zi'') of the matrix output lines (row lines) . . . zi . . . are charged, via the respective precharge transistor (Tpi' or Tpi'' in FIG. 2 to 4), at least approximately to the $U_{DD}$ operating potential. For this, the precharge transistors Tpi', Tpi'' composed of p-channel transistors are rendered conductive, in the example, via a "low"-clock signal T (see FIG. 5d, line T).

Thereby, with the dropping edge of the clock signal T, the cross transistor Tpi''' connected between the two signal conductors zi',zi'' simultaneously becomes conductive, with the consequence of a short-circuit of the two signal conductors zi',zi''. As a result, at the beginning of the prephase, very rapidly (time tl in FIG. 5c) a potential compensation of the two signal conductors zi', zi'' occurs; after which, both signal conductors zi',zi'' (now balanced regarding their potentials) are charged via the two precharge transistors Tpi', Tpi'' to the $U_{DD}$ operating potential. The charging duration is thereby shortened in that after the potential compensation induced by the cross transistor Tpi''', both precharge transistors Tpi', Tpi" are integrated in the charging event.

Simultaneously with the deblocking of the precharge transistors Tpi', Tpi" and the cross transistor Tpi''' the sampling transistors Tna (Tnaj in FIG. 2, Tnaj in FIG. 3, Tnai in FIG. 4) composed of n-channel transistors are out-controlled, i.e. blocked, in the opposite direction in the example via the same "low"-clock signal T. As a result the charging of the respectively two signal conductors (zi',zi") of the matrix output lines (row lines) . . . zi . . . can take place independently from the control of the respective switch transistors Tpk, Tnk (in FIG. 2 to 4) and the respective auxiliary transistors Tpe, Tne (in FIG. 2 to 4) of the individual switching element couples . . . Kij . . . On the respective matrix input line (column line) . . . sj . . . it is possible that the potential corresponding to the bit to be switched through is already building up (or respectively kept) as shown in line sj of FIG. 5b.

If a precharge transistor Tpaj provided for each matrix input line is provided in addition to a sampling transistor Tnaj provided for each matrix input line, as shown in FIG. 3, or if a precharge transistor Tpai provided for each matrix output line is provided in addition to a sampling transistor Tnai, provided for each matrix output line, as shown in FIG. 4, the pseudo-ground line PM is charged via this precharge transistor (Tpaj in FIG. 3, Tpai in FIG. 4) during the prephase pv. The respective switching element couple . . . Kij . . . is thereby discharged. Especially in the case of large switching point matrices with a plurality of switching element couples . . . Kij . . . connected to the pseudo ground line PM, this leads to a considerable reduction of the charging time which contributes to a corresponding increase of the operating speed.

Due to the potential uniformity of the two signal conductors zi',zi" induced via the cross transistor Tpi''', the starting conditions for good amplification via the differential amplifier Ai (in FIG. 1) are given at a correspondingly earlier time, so that at a correspondingly earlier time the subsequent main phase ph (see FIG. 5, bottom) can set in. In this main phase ph (see FIG. 5 bottom), precharge transistors Tpi', Tpi" and cross transistor Tpi''' (in FIGS. 2 to 4) are blocked, in the example via a "high"-clock signal T (see FIG. 5, line T). Also, simultaneously the sampling transistors Tna (Tnaij in FIG. 2, Tnaj in FIG. 3, Tnai in FIG. 4) are deblocked. If, in a switching element couple . . . Kij . . . its switch transistor Tpk, Tnk (in FIG. 2 to 4) is conductive due to a (in the example "low") through switching signal residing at the control input s' and due to a (in the example "high") through switching signal at the control input s" (see FIG. 5a, line s), and is thus the switching point in a through switching condition, the signal conductors zi',zi" of the matrix output line (row line) . . . zi . . . connected with this matrix input line (column line) . . . sj . . . via the respective switching element . . Kij . . are now discharged or remain at the $U_{DD}$ potential accepted in the prephase pv depending on the signal condition corresponding to the bit to be switched through and prevailing on the respective matrix input line (column line) . . . sj . . . .

If the "low" signal condition prevails on the respective matrix input line (column line) sj, and if correspondingly the n-channel auxiliary transistor Tne (in FIGS. 2 to 4) of the respective switching element couple Kij blocked, the respective signal conductor zi" of the matrix output line (row line) zi is not discharged via the respective switching element of this switching element couple Kij, but rather keeps the $U_{DD}$ potential condition provided that no other switching point for this matrix output line (row line) zi is in through switching condition.

Simultaneously, the auxiliary transistor Tpe (in FIG. 2 to FIG. 4) of the contemplated switching element couple Kij, as well as, the switch transistor Tpk and the appertaining sampling transistor Tna are conductive so that the allocated signal conductor zi' of the matrix output line (row line) zi is discharged via this switching element of the switching element couple Kij and drawn to the $U_{SS}$ potential.

If, however, the "high" signal condition prevails on this matrix input line sj, and if correspondingly the n-channel auxiliary transistor Tne (in FIGS. 2 to 4) of the respective switching element couple Kij is conductive, the respective signal conductor zi" of the matrix output line (row line) zi is discharged via the respective switching element of this switching element couple Kij, and drawn to the $U_{SS}$ potential.

Simultaneously, the auxiliary transistor Tpe (in FIG. 2 to FIG. 4) of the contemplated switching element couple Kij is not conductive so that the allocated signal conductor zi' of the matrix output line (row line) zi is not discharged via this switching element of the switching element couple Kij, but keeps the $U_{DD}$ potential condition provided that no other switching point for this matrix output line (row line) zi is in through switching condition.

In the exemplary embodiments explained above with FIG. 2 to FIG. 4, the precharge transistors (Tpi', Tpi") are composed of p-channel transistors, whereby these p-channel precharge transistors (Tpi) and the sampling transistors (Tna) composed of n-channel transistors are controlled oppositely relative to one another via the same signal (T) due to the different type of channels. As a variation it is also possible, however, to realize the precharge transistors with n-channel transistors so that, even if the switch transistors (Tnk), the auxiliary transistors (Tne) and the sampling transistors (Tna) are n-channel transistors only transistors of the same channel type are applied. For the precharge transistors and the sampling transistors to be charged oppositely again relative to one another at their control electrode with the selection clock for switching matrix arrays, it is necessary that (as described in the exemplary embodiments of FIGS. 2 to 4) the sampling transistors (Tna) are supplied directly with the clock signal for switching matrix arrays (T). The (n-channel) precharge transistors, however, are supplied with an inverted clock signal for switching matrix arrays.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Broadband signal switching equipment having a switching point matrix using FET-technology devices and having matrix input lines connected, via switching points respectively constituted by switching element couples, with matrix output lines respectively constituted by two output signal conductors, two signal inputs of an output amplifier circuit composed of a differential amplifier with a trigger characteristic connected to the two output signal conductors, the switching element couples respectively composed of two switch transistors each including a respective main electrode connected to a respective output signal conductor and a control electrode connected to receive a through-connect signal and two auxiliary transistors respectively forming a series connection with a respective switch transistor each auxiliary transistor including a control electrode connected to a signal input conductor of the respective matrix input line and a main electrode thereof connected to one terminal of an operating voltage source via a sampling transistor of the respective matrix output line via a respective precharge transistor, the precharge transistor and the sampling transistor being oppositely charged at their respective control electrodes with a selection clock for switching matrix arrays thereby dividing a bit-throughconnecting-interval into a precharging phase and an actual throughconnecting phase, so that in each precharging phase, given a blocked sampling transistor, both signal output conductors of the matrix output line are charged via the respective precharge transistor at least approximately to a potential on the other terminal of the operating voltage source, and the two precharge transistors having first main electrodes interconnected via a cross transistor whose control electrode is connected to the control electrodes of the precharge transistors, the first main electrodes of the two precharge transistors being connected to the respective matrix output line, comprising: switching element couples respectively having two auxiliary transistors of various channel types which have their control electrodes connected to the same signal conductor of the appertaining matrix input line.

2. The broadband signal switching equipment according to claim 1, wherein the switching element couples respectively have two switch transistors of different channel types which respectively form a series connection with an auxiliary transistor of the same channel type.

3. The broadband signal switching equipment according to claim 2, wherein only a first part of the switching element couples connected to the same matrix output line has the transistor series connection of the one channel type connected to one output signal conductor and the transistor series connection of the other channel type connected to the other output signal conductor of the matrix output line, whereas in the case of the other second part of the switching element couples being connected to the respective matrix output line, the transistor series connection of the other channel type is connected to the one output signal conductor, and the transistor series connection of the one channel type is connected to the other output signal conductor of the matrix output line.

4. The broadband signal switching equipment according to claim 3, wherein with regards to the first part as well as with regards to the second part of the switching element couples, switching element couples connected to the output signal conductors of the appertaining matrix output lien follow each other in the respective matrix row in an alternating fashion.

5. The broadband signal switching equipment according to claim 4, wherein, in addition to a sampling transistor provided for each matrix input line, a precharge transistor is provided for each matrix input line.

6. The broadband signal switching equipment according to claim 4, wherein, in addition to a sampling transistor provided for each matrix output line, a precharge transistor is provided for each matrix output line.

7. Broadband signal switching equipment having a switching point matrix using FET-technology devices and having matrix input lines connected, via switching points respectively constituted by switching element couples, with matrix output lines respectively constituted by two output signal conductors, two signal inputs of an output amplifier circuit composed of a differential amplifier with a trigger characteristic connected to the two output signal conductors, the switching element couples respectively composed of two switch transistors each including a respective main electrode connected to a respective output signal conductor and a control electrode connected to receive a through-connect signal which are charged respectively at a control electrode with a throughput signal or a blocking signal and which have one main electrode connected to one or the other signal conductor of the appertaining matrix output line and two auxiliary transistors respectively forming a series connection with a respective switch transistor each auxiliary transistor including a control electrode connected to a signal input conductor of the respective matrix input line and a main electrode thereof connected to one terminal of an operating voltage source via a sampling transistor, the other terminal of the operating voltage source being connected to each signal output conductor of the respective matrix output line via a respective precharge transistor, the precharge transistor and the sampling transistor being oppositely charged at their respective control electrode with a selection clock for switching matrix arrays thereby dividing a bit-throughconnecting-interval into a precharging phase and an actual throughconnecting phase, so that in each precharging phase, given a blocked sampling transistor, both signal output conductors of the matrix output line are charged via the respective precharge transistor at least approximately to a potential on the other terminal of the operating voltage source, and the two precharge transistors having first main electrodes interconnected via a cross transistor whose control electrode is connected to the control electrodes of the precharge transistors, the first main electrodes of the two precharge transistors being connected to the respective matrix output line, comprising: switching element couples respectively having two auxiliary transistors of various channel types which have their control electrodes connected to the same signal conductor of the appertaining matrix input line; the switching element couples respectively having two switch transistors of different channel types which respectively form a series connection with an auxiliary transistor of the same channel type; only a first part of the switching element couples connected to the same matrix output line having the transistor series connection of the one channel type connected to one output signal conductor and the transistor series connection of the other channel type connected to the other output signal conductor of the matrix output line, whereas in the case of the other second part of the switching element couples being connected to the respective matrix output line, the transistor series connection of the other channel type is connected to the one output signal conductor, and the transistor series connection of the one channel type is connected to the other output signal conductor of the matrix output line.

8. The broadband signal switching equipment according to claim 7, wherein with regards to the first part as well as to the second part of the switching element couples, switching element couples connected to the signal conductors of the appertaining matrix output line follow each other in the respective matrix row in an alternating fashion.

9. The broadband signal switching equipment according to claim 7, wherein, in addition to a sampling transistor provided for each matrix input line, a precharge transistor is provided for each matrix input line.

10. The broadband signal switching equipment according to claim 7, wherein, in addition to a sampling transistor provided for each matrix output line, a precharge transistor is provided for each matrix output line.

* * * * *